(12) United States Patent
Wilson et al.

(10) Patent No.: US 11,074,672 B2
(45) Date of Patent: Jul. 27, 2021

(54) METHOD OF IMAGE PROCESSING AND DISPLAY FOR IMAGES CAPTURED BY A CAPSULE CAMERA

(71) Applicant: CapsoVision, Inc., Saratoga, CA (US)

(72) Inventors: Gordon C. Wilson, San Francisco, CA (US); Yi Xu, Menlo Park, CA (US); Kang-Huai Wang, Saratoga, CA (US); Chenyu Yu, Sunnyvale, CA (US)

(73) Assignee: CapsoVision Inc., Saratoga, CA (US)

( * ) Notice: Subject to any disclaimer, the term of this patent is extended or adjusted under 35 U.S.C. 154(b) by 0 days.

(21) Appl. No.: 16/492,918

(22) PCT Filed: Apr. 19, 2017

(86) PCT No.: PCT/US2017/028445
§ 371 (c)(1),
(2) Date: Sep. 10, 2019

(87) PCT Pub. No.: WO2018/194599
PCT Pub. Date: Oct. 25, 2018

(65) Prior Publication Data
US 2020/0013143 A1    Jan. 9, 2020

(51) Int. Cl.
*G06T 3/40* (2006.01)
*G06T 3/00* (2006.01)

(52) U.S. Cl.
CPC .......... *G06T 3/4023* (2013.01); *G06T 3/0081* (2013.01); *G06T 3/0093* (2013.01)

(58) Field of Classification Search
CPC . G06T 3/4038; G06T 2200/32; G06T 3/4023; G06T 3/0081; G06T 3/0093
See application file for complete search history.

(56) References Cited

U.S. PATENT DOCUMENTS

| 7,120,313 | B2 | 10/2006 | Kotake et al. |
| 8,194,936 | B2 | 6/2012 | Abramoff et al. |
| 9,247,133 | B2 | 1/2016 | Doepke |
| 9,324,172 | B2 | 4/2016 | Wu et al. |
| 2010/0060750 | A1* | 3/2010 | Tomono ................ G06T 3/4038 348/222.1 |
| 2015/0248591 | A1* | 9/2015 | Shi ........................ G06K 9/20 382/195 |
| 2016/0037082 | A1* | 2/2016 | Wang ..................... G06T 5/006 348/65 |
| 2018/0176531 | A1* | 6/2018 | Liu ........................ G06T 5/005 |

* cited by examiner

*Primary Examiner* — Jeffrey A Brier
(74) *Attorney, Agent, or Firm* — Blairtech Solution LLC

(57) ABSTRACT

A method and apparatus of processing and displaying images captured using an in vivo capsule camera are disclosed. One or more overlapped areas between a target image and each image in a neighboring image group are determined, which comprises at least two neighboring images around the target image. Marked pixels in the target image are then determined, where a pixel in the target image is designated as a marked pixel if the pixel is within an overlapped area between the target image and at least one neighboring image. If the total number of the marked pixels in the target image exceeds a threshold and the number of the marked pixels associated with the overlapped area(s) between the target image and any image in the neighboring image group is below the threshold, the target image is excluded from a set of images to be displayed on a display device.

19 Claims, 2 Drawing Sheets

METHOD OF IMAGE PROCESSING AND DISPLAY FOR IMAGES CAPTURED BY A CAPSULE CAMERA

CROSS REFERENCE TO RELATED APPLICATIONS

The present invention is related to PCT Patent Application, Serial No. PCT/US14/38533, filed on May 19, 2014, which claims priority to U.S. Provisional Patent Application Ser. No. 61/828,653, filed on May 29, 2013. The present invention is also related to U.S. patent application Ser. No. 14/675,744, which is granted as U.S. Pat. No. 9,324,172, on Apr. 26, 2016. The PCT Patent Application, U.S. Provisional Patent, U.S. Non-provisional Patent and U.S. Patent are incorporated by reference in their entireties.

FIELD OF THE INVENTION

The present invention relates to reducing time and efforts of examining images captured by an in vivo capsule camera. In particular, the present invention addresses aspect of reducing number of images for visualization.

BACKGROUND AND RELATED ART

Capsule endoscope is an in vivo imaging device which addresses many of problems of traditional endoscopes. A camera is housed in a swallowable capsule along with a radio transmitter for transmitting data to a base-station receiver or transceiver. A data recorder outside the body may also be used to receive and record the transmitted data. The data primarily comprises images recorded by the digital camera. The capsule may also include a radio receiver for receiving instructions or other data from a base-station transmitter. Instead of using radio-frequency transmission, lower-frequency electromagnetic signals may be used. Power may be supplied inductively from an external inductor to an internal inductor within the capsule or from a battery within the capsule. In another type of capsule camera with on-board storage, the captured images are stored on-board instead of transmitted to an external device. The capsule with on-board storage is retrieved after the excretion of the capsule. The capsule with on-board storage provides the patient the comfort and freedom without wearing the data recorder or being restricted to proximity of a wireless data receiver.

The images and data after being acquired and processed are usually displayed on a display device for a diagnostician or medical professional to examine. Typically, a large number of images are captured when the capsule travels through the gastrointestinal (GI) tract. The number of captured images may be as large as 20,000 frames or more. In order to view the large number of captured images efficiently, the images are often displayed as a video sequence with a typical video frame rate, such as 30 frames per second. Even so, it will still take users more than one hour for viewing the whole sequence. Various viewing tools have been developed to help a viewer to quickly locate image or images of interest. For example, bookmarking images to quickly locate images of interest or providing a navigation bar with anatomical information marking to quickly access to a desired GI location of interest.

In PCT Patent Application, Serial No. PCT/US14/38533, a method to stitch an image sequence to generate composite images with larger image sizes is disclosed. In the conventional approach, each image only provides a limited view of a small section of the GI tract. In the PCT Patent Application, Serial No. PCT/US14/38533, image stitching techniques are disclosed to generate wide images so as to provide a larger field of view from multiple intra images captured by multiple cameras within a capsule according to one embodiment. The wide images are further stitched to form a large picture, which can take advantage of the high-resolution large-screen display device to allow a user to visualize more information at the same time. An image stitching process may involve removing redundancy in overlapped areas between images so that a larger area of the inner GI tract surface can be viewed at the same time in a single composite picture. In addition, a large picture can provide a complete view or a significant portion of the inner GI tract surface. It should be easier and faster for a diagnostician or a medical professional to quickly spot an area of interest, such as a polyp. The image stitching process can reduce image numbers and accelerate the review process.

The PCT Patent Application, Serial No. PCT/US14/38533, also discloses time-space representation as an alternative way to visualize captured image. The time-space representation displays a static composite image for each time instance selected by a user. At the selected time, individual images (particularly these images nearby) will be warped onto the selected image coordinates. However tissues in the GI tract often deform. Accordingly, local deformation is used in PCT Patent Application, Serial No. PCT/US14/38533 to improve the visual quality and allow the user to view a target image and its neighboring images with a proper perspective.

The reconstruction and stitching processes for the large number of captured images are very time consuming. On the other hand, captured capsule images often contain substantial redundancy among neighboring images. It is desirable to explore the redundancy among images to remove some redundant images from the reconstruction and stitching processes. Such technique may also help to reduce the viewing time of the image sequence.

SUMMARY OF INVENTION

A method and apparatus of processing and displaying images captured using an in vivo capsule camera are disclosed. According to the invention, one or more overlapped areas between a target image and each image in a neighboring image group of the target image are determined, where the neighboring image group comprises at least two neighboring images. Each overlapped area between the target image and one neighboring image corresponds to a set of first pixels in the target image and a set of second pixels in said one neighboring image associated with a same scene. Marked pixels in the target image are then determined, where a pixel in the target image is designated as a marked pixel if the pixel is within an overlapped area between the target image and at least one neighboring image. If the total number of the marked pixels in the target image exceeds a threshold, the target image is excluded from the plurality of images to form a set of remaining images, where the set of remaining images is displayed on a display device.

In one embodiment, the overlapped area(s) between the target image and one neighboring image in the neighboring image group is determined by using deformable registration between the target image and said one neighboring image. The deformable registration may correspond to warping said one neighboring image onto the target image using a transformation model including non-rigid transformation. Furthermore, image similarity metric or image distortion metric can be measured between the warped neighboring image and the target image and the deformable registration is asserted only if the image similarity metric or the image distortion satisfies a condition. For example, the deformable registration is asserted only if the image similarity metric is above an image similarity threshold or the image distortion metric is below an image distortion threshold. The image similarity metric may correspond to Normalized Cross Correlation (NCC), Mutual Information (MI), or Sum of Squared Differences (SSD). The image distortion metric may correspond to maximum displacement of any pixel or average displacement of pixels.

If a selected neighboring image is warped onto a current target image using a first transformation model and when the selected neighboring image becomes a new target image, the current target image can be warped onto the new target image using a second transformation model corresponding to an inverse transformation model of the first transformation model. Accordingly, the required computation can be reduced by almost half.

During deformable registration between the target image and a neighboring image, if two or more images other than the target image in the neighboring image group are well registered, the two or more images are stitched into a temporary image and said one or more overlapped areas between the target image and each of the two or more images are evaluated via said one or more overlapped areas between the target image and the temporary image.

The threshold is substantially larger than half of a total number of pixels in each image and less than or equal to the total number of pixels in each image. For example, the threshold can be set to a value range from 75% to 95% of the total pixels in each image. The neighboring image group may comprise one or more first images captured prior to the target image and one or more second images captured after the target image. The neighboring image group may only include two or more first images captured prior to the target image or only include two or more second images captured after the target image. On the other hand, the plurality of images comprises input images captured by the capsule camera, previously stitched temporary images, or both. A total number of neighboring images in the neighboring image group can be determined adaptively according to characteristics of the neighboring image group. For example, for neighboring images corresponding to slow moving capsule, the total number of neighboring images in the neighboring image group can be larger.

The process of excluding target images with substantial overlap with neighboring images can be applied repeatedly. For example, after an iteration of target image exclusion, the process can be applied to the set of remaining images. The total number of neighboring images in the neighboring image group can be fixed in each iteration. In another embodiment, the total number of neighboring images in the neighboring image group in one iteration is different from another iteration. Furthermore, the present invention may also be used with sequential image stitching. For example, sequential stitching can be applied to remaining images after one or more target images are excluded, where said sequential stitching performs pairwise stitching if two images having a large degree of picture overlap. Also, the sequential switching can be applied prior to the present invention. For example, the to-be-processed images may correspond to a processed sequence from sequential stitching on input images, where said sequential stitching performs pairwise stitching if two images having a large degree of picture overlap.

DETAILED DESCRIPTION OF THE INVENTION

In the following description, various aspects of the present invention will be described. For purposes of explanation, specific configurations and details are set forth in order to provide a thorough understanding of the present invention. Well known features may be omitted or simplified in order not to obscure the present invention.

In image registration, the goal is to align two images by warping one image to another according to some mathematical models. Model parameters have to be estimated from the captured images. Two images may be registered directly in the pixel domain. The pixel-based registration is also called direct match, which compares the similarity of two image areas based on the image intensity. Image registration based on features extracted from images is another popular approach to the image registration. The feature-based registration first determines a set of feature points in each image and then compares the corresponding feature descriptors. To match two image patches or features captured from two different camera positions or two different viewing angles, an affine camera model including scaling, rotation, etc. is estimated based on the correspondences. To match two images captured at two different camera positions or two different angles, a non-rigid camera model including local deformation can be used.

The number of feature points is usually much smaller than the number of pixels of a corresponding image. Therefore, the computational load for feature-based image registration is substantially less than that for pixel-based image matching. However, it is still time consuming for pair-wise matching.

Figure 1:
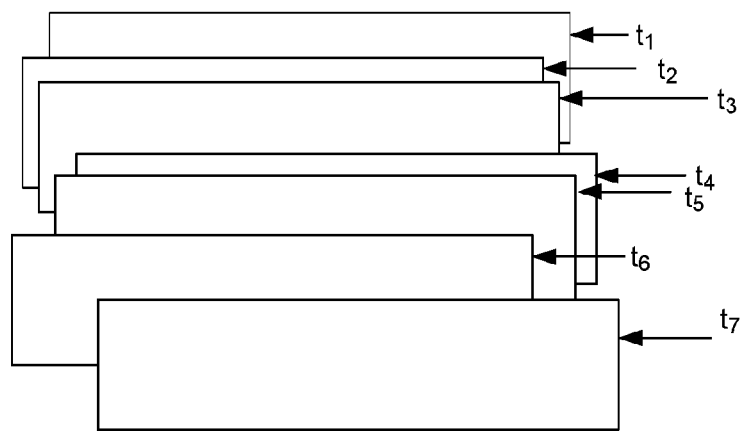
FIG. 1 illustrates an exemplary scenario of images captured by an in vivo camera, where some of two neighboring images have a large percentage of overlap.

In order to expedite the reconstruction/stitching process, sequential image stitch methods has been disclosed in U.S. Pat. No. 9,324,172. The invention first stitches pairs of images that can be reliably stitched. For example, the images having large overlap exceeding a threshold are stitched into larger images so that the number of images is reduced. The larger images imply that larger areas of the corresponding scenes (e.g., the gastrointestinal tract of a human body) can be viewed at the same time to reduce the required viewing time. If the current image and none of its neighboring N images can be stitched, the current image is designated as a non-stitched image. FIG. 1 illustrates an example of a set of images to be stitched, where some images (i.e., $t_2$ and $t_3$, $t_4$ and $t_5$) have substantial overlap with another image among the neighboring images. Therefore, images sharing big overlap will be stitched together first (i.e., $t_2$ and $t_3$ stitched, $t_4$ and $t_5$ stitched). As is known in the field of image registration, an overlapped area between two images corresponds to a set of pixels in these two images that correspond to a same scene.

To identify these images, a global transformation can be estimated by exhaustively searching for intensity based image matching under the assumption of a global rigid transformation. Once the global transformation is estimated, the overlap between images can be computed. If the degree of overlap is over a pre-defined threshold, a local transformation such as free-form deformation cubic B-splines can be applied to the overlap area. Furthermore, gradient-based method can be used for optimization of the transformation model parameters. When two stitched images with a large size difference are viewed consecutively, one image may cover a small area on the screen while another may nearly fill up the screen. This would result in very distracting viewing experience. However, in the first stage of stitching, only images with large overlap will be stitched. As a result, the size of the stitched images may not vary too much. It will avoid the potential distracting viewing problem.

After the first stage of stitching is done, the overlap of a given image with neighboring images will be less than a threshold overlap. According to one embodiment of U.S. Pat. No. 9,324,172, the second stage will stitch images with small overlap (i.e., overlap below a low threshold) to generate a composite image with a bigger field of view.

In an image sequence, a target image may only have small overlap with any single neighboring image. However, while the target image may only have small overlap with any image in a neighboring image group comprising multiple neighboring images, the whole target image or majority of the target image may be within an overlapped area between the target image and at least one respective neighboring image in the neighboring image group. Therefore, this target image may become redundant in view of the neighboring image(s) in the neighboring image group. According to sequential stitching (U.S. Pat. No. 9,324,172, issued on Apr. 26, 2016), this target image will be excluded from the first stage stitching since the degree of overlap will not satisfy the criterion. Consequently, this target image will be subject to the second stage stitching with one or more other images according to the sequential stitching.

The present invention discloses a method to identify such target image and reduce the number of images to be viewed. To illustrate the processing according to the present invention, we assume a sequence of images $f_1, f_2, f_3, \ldots, f_{n-3}, f_{n-2}, f_{n-1}, f_n, f_{n+1}, f_{n+2}, f_{n+3}$, etc. For a target image $f_n$, the overlapped pixels between the target image and each neighboring image belonging to a neighboring image group are determined, where the neighboring image group comprises at least two neighboring images. If a pixel in the target image is within an overlapped area between the target image and any neighboring image belonging to the neighboring image group, the pixel is designated as a "marked pixel". If all pixels or most pixels in the target image correspond to marked pixels, it implies that the target image is fully or almost fully overlapped with the neighboring images in the neighboring image group. Accordingly, this target image can be dropped from a set of images to be displayed on a display device.

Figure 2:
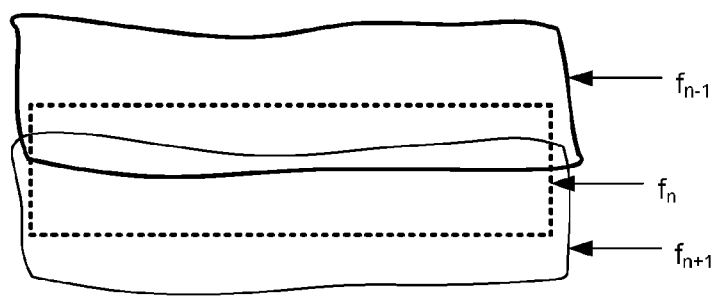
FIG. 2 illustrates an example of warping two neighboring images onto one target image individually and measuring the overlap areas between target image and a respective warped neighboring image.

For capsule images, a given area in the GI wall may be seen in multiple capsule images. However, the pixels in the corresponding overlapped may look very differently since the overlapped areas in two images are captured from different perspectives associated with the two images and the GI wall is also undergoing deformation between the two images. Accordingly, for each image $f_n$, a deformable registration is computed between and each neighboring images in the neighboring image group. For example, the neighboring group may consist of images from image $f_{n-k}$ to image $f_{n+k}$. Image $f_n$ is designated as the fixed image and a neighboring image is designated as the float image. The result of the deformable registration is a transformation model T that can be applied to the float image and bring the float image into alignment with the fixed image $f_n$. As mentioned previously, capsule images captured by the capsule camera are far from the ideal model environment. Therefore, after the registration, an image similarity metric or image distortion metric can be selected to make sure that the registration satisfies certain criteria. For example, the certain criteria may correspond to the image similarity metric above a threshold or image distortion metric below a threshold. Normalized Cross Correlation (NCC) or other types of similarity measure can be used for the image similarity metric. Maximum displacement of any pixel or other types of distortion measure can be used as the distortion metric. FIG. 2 illustrates an example of warping two neighboring images onto one target image individually and measuring the overlap areas between target image and a respective warped neighboring image. Image is designated as the fixed image and two neighboring images ($f_{n-1}$ and $f_{n+1}$) are designated as the float images to be warped onto image $f_n$. The two neighboring images ($f_{n-1}$ and $f_{n-1}$) are shown in the deformed format according to a transformation model.

For each pair of images with good registration between $f_n$ and neighbor $f_m$, the overlap between $f_n$ and $T(f_m)$ can be determined, where $T(f_m)$ denotes warping $f_m$ using the computed transformation model T. The similarity metric is measured between $f_n$ and $T(f_m)$ for the overlapped area. If the similarity metric (e.g. NCC) indicates good registration (e.g. the NCC below a threshold), registration is validated. These overlap pixels in $f_n$ can be marked. On the other hand, if the result of the similarity metric measure is not satisfied, the registration for this overlapped area will not be confirmed. These pixels in the overlapped area will not be marked in this case. Alternatively, registration may be tried out for smaller overlapped area. When all the neighboring images from $f_{n-k}$ to $f_{n+k}$ are processed, a test can be performed to check whether all or more than a high percentage of the pixels in $f_n$ are marked. If the condition is satisfied (e.g. 95% of pixels in the target image $f_n$ being marked), this implies all or most the contents in image $f_n$ can be found in other images (i.e., images from $f_{n-k}$ to $f_{n+k}$) and $f_n$ is considered to be redundant. Therefore, image $f_n$ can be dropped from the sequence for visualization. In other words, this image will not be displayed to the user for viewing. However, a user may request the system to show one or more dropped images for review.

In the above example, neighboring images from $f_{n-k}$ to $f_{n-1}$ and from $f_{n+1}$ to $f_{n+k}$ are included in the neighboring image group for the current image $f_n$. However, not every image in a specified range has to be included in the neighboring image group. Furthermore, the number of neighboring images prior to the current image $f_n$ doesn't have to be the same as the number of neighboring images after the current image. The neighboring image group can be viewed as a window around a current image $f_n$. The window size (e.g. the number of images from $f_{n-k}$ to $f_{n+k}$) can be determined adaptively according to characteristics of neighboring images. For example, the window size can be dependent on the capsule moving speed.

For the method described above, there are some practical considerations discussed as follows:

1. When the abovementioned process is applied to the target image $f_n$, $f_n$ is treated as a fixed image. On the other hand, when the above mentioned process is applied to a neighboring image (e.g., $f_{n+k}$) later, $f_n$ is treated as a float image, where k is a positive integer. Since the transformation T from $f_{n+k}$ to $f_n$ has been computed already, there is no need to derive the transformation from $f_n$ to $f_{n+k}$. Instead, the inverse transformation $T^{-1}$ can be used directly to warp image $f_n$ onto image $f_{n+k}$. In this sense, the required computations for deformable registration process can be reduced to half.

2. Once the abovementioned process has been applied to all the images in a neighboring image group of a target image to determine whether the target image can be dropped, the process can be applied again to all the remaining images in the sequence after identified redundant images are dropped. After dropping one or more target images from the current neighboring image group, the next neighboring image group to be processed effectively includes a larger neighboring range than a previous round of processing. Accordingly, by repeating this process, more images can be dropped. For example, if frame A is a current target frame and the overlapped areas between frame A and two neighboring frames (e.g. B and C) exceed a threshold, frame A can be dropped. During further processing with frame B as the target image, the overlapped areas between frame B and two neighboring frames (e.g. D and E) exceed a threshold, frame B can be further dropped. The redundant information in frame A is preserved in remaining frames (i.e., C, D and E). During the iterative process, the number of neighboring images in the neighboring image group can be fixed. However, the number of neighboring images in the neighboring image group doesn't have to be the same during the iterative process.

3. Instead of always performing deformable registration between two original images, one or both of the images can be already-stitched images. The deformable registration process does not perform image stitching. However, the stitching can be applied in an intermediate step to speed up the required processing. For example, if image $f_{n-2}$ and $f_{n-1}$ are well registered, the two images can be stitched together temporarily to form image $f_{n-2,n-1}$. Then when deciding whether contents of image $f_n$ are covered by other images, only registering image $f_{n-2,n-1}$ to $f_n$ is required instead of registering $f_{n-1}$ to $f_n$ and $f_{n-2}$ to $f_n$ separately. In another situation, during the overlapped area evaluation for a current target image (e.g. $f_n$), if a neighboring image (e.g. $f_{n-1}$) is substantially overlapped with the target image, the neighboring image (e.g. $f_{n-1}$) and the current target image (e.g. $f_n$) can be temporarily stitched into a stitched image (e.g. $f_{n-1,n}$). When the processing is moved on to a new target image (e.g. $f_{n+1}$), the similarity metric or distortion metric is measured between the new target image and its neighboring images, the neighboring images will be warped onto this new target image. Therefore, both images $f_{n-1}$ and $f_n$ will be warped onto the target image $f_{n+1}$. However, according to an embodiment of this invention, a single stitched image (e.g. $f_{n-1,n}$) is warped on to the new target image (e.g. $f_{n+1}$) instead of warping two images ($f_{n-1}$ and $f_n$).

4. The overlapped area evaluation can be performed independently for the target frames. The independent processing would allow overlapped area evaluation perform in parallel. After the overlapped areas are evaluated, the method can determine and drop redundant target image(s). Since the overlapped areas for all target images can be assessed together, this approach will maximize the probability of dropping frames. Furthermore, the process can also be performed iteratively after the target frames are dropped. If the window size of the neighboring image group is the same, the effective window size may become larger in the next iteration due to target frame dropping.

In the above example, the neighboring image group may include images with time indices before the current image (e.g. $f_{n-k}, \ldots, f_{n-1}$) and after the current image (e.g. $f_{n+1}, \ldots, f_{n+k}$). However, the neighboring image group may also only include images with time indices before the current image or only include images with time indices after the current image. Since the capsule camera may oscillate or temporarily move retrograde while travelling through the GI tract, images with time indices after the current image may cover images spatially before and after the location of the current image.

The current invention can be used along with the inventions disclosed in PCT Patent Application, Serial No. PCT/US14/38533 and U.S. patent application Ser. No. 14/675,744. For example, the present invention can be combined with the time-space representation disclosed in PCT/US14/38533 so that a target image with substantial overlap with two or more neighboring images can be removed from viewing to reduce the number of images to be viewed. After the target images with substantial overlap are removed, the remaining images can be displayed according to the time-space representation.

In another embodiment, after the target images with substantial overlap are removed, the remaining images can be sequentially stitched according to the method disclosed in the U.S. patent application Ser. No. 14/675,744. In yet another embodiment, the sequential stitching can be applied first. Image pairs with large overlap can be stitched first during the first-stage stitching. After the first-stage stitching, the present invention can be applied to identify the target images, where each target image has substantial overlap with two or more neighboring images. Furthermore, the process of identifying and removing the targeted images having substantial overlap each with two or more images and the sequential stitching process can be applied iteratively.

Figure 3:
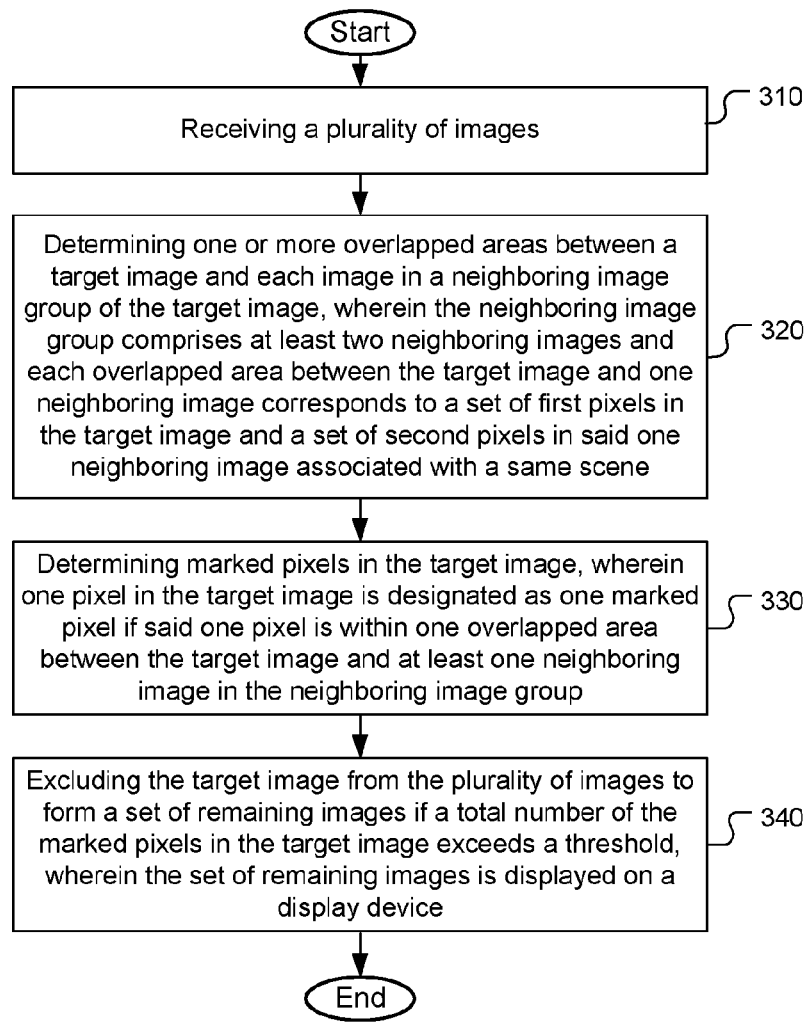
FIG. 3 illustrates an exemplary flowchart for image processing and display according to an embodiment of the present invention, where a target image is excluded from a set of images to be displayed on a display device if the total number of the marked pixels in the target image exceeds a threshold.

FIG. 3 illustrates an exemplary flowchart of a system for processing and displaying images captured by an in vivo capsule camera incorporating an embodiment of the present invention. The flowchart may correspond to software program codes to be executed on a computer, a server, a digital signal processor or a programmable device for the disclosed invention. The program codes may be written in various programming languages. The flowchart may also correspond to hardware based implementation, where one or more electronic circuits (e.g. ASIC (application specific integrated circuits) and FPGA (field programmable gate array)) or processors (e.g. DSP (digital signal processor)). A plurality of images is received in step 310. The images may be retrieved from memory or received from a processor. One or more overlapped areas between a target image and each image in a neighboring image group of the target image is determined in step 320, wherein the neighboring image group comprises at least two neighboring images and each overlapped area between the target image and one neighboring image corresponds to a set of first pixels in the target image and a set of second pixels in said one neighboring image associated with a same scene. As mentioned above, deformable registration may be used to identify the overlapped area(s). Marked pixels in the target image are then determined in step 330, where one pixel in the target image is designated as one marked pixel if said one pixel is within one overlapped area between the target image and at least one neighboring image in the neighboring image group. The target image is excluded from the plurality of images to form a set of remaining images if a total number of the marked pixels in the target image exceeds a threshold, where the set of remaining images is displayed on a display device as shown in step 340.

The invention may be embodied in other specific forms without departing from its spirit or essential characteristics. The described examples are to be considered in all respects only as illustrative and not restrictive. Therefore, the scope of the invention is indicated by the appended claims rather than by the foregoing description. All changes which come within the meaning and range of equivalency of the claims are to be embraced within their scope.

The invention claimed is:

1. A method of processing and displaying images captured by an in vivo capsule camera, the method comprising:
   receiving a plurality of images comprising a target image and a neighboring image group of the target image;
   applying deformable registration between the target image and one or more float images in the neighboring image group of the target image;
   determining marked pixels in overlapped areas corresponding to deformed-and-registered image data common to both the target and at least one of said one or more float images; and
   excluding the target image from visualizing the plurality of images if a total number of the marked pixels exceeds a threshold.

2. The method of claim 1, wherein said deformable registration corresponds to warping one float image onto the target image using a transformation model including non-rigid transformation.

3. The method of claim 2, wherein the deformable registration between one target image area and one neighboring image area is asserted only if image similarity metric or image distortion metric satisfies a condition.

4. The method of claim 3, wherein the deformable registration is asserted only if image similarity metric is above a similarity threshold or image distortion metric is below a distortion threshold.

5. The method of claim 4, wherein the image similarity metric is selected from an image similarity metric group comprising Normalized Cross Correlation (NCC), Mutual Information (MI), and Sum of Squared Differences (SSD).

6. The method of claim 4, wherein the image distortion metric is selected from an image distortion metric group comprising maximum displacement of any pixel and average displacement of all pixels.

7. The method of claim 2, wherein if one selected neighboring image is warped onto a current target image using a first transformation model and when said one selected neighboring image becomes a new target image, the current target image is warped onto the new target image using a second transformation model corresponding to an inverse transformation model of the first transformation model.

8. The method of claim 1, wherein if two or more neighboring images in the neighboring image group of the target image are well registered, the two or more neighboring images are stitched into a new neighboring image, and the new neighboring image is placed in the neighboring image group of the target image.

9. The method of claim 1, wherein the threshold is substantially larger than half of a total number of pixels in each image and less than or equal to the total number of pixels in each image.

10. The method of claim 1, wherein the threshold is selected from a value range from 75% to 95% of a total number of pixels in each image.

11. The method of claim 1, wherein the neighboring image group comprises one or more first images captured prior to the target image and one or more second images captured after the target image.

12. The method of claim 1, wherein the neighboring image group only includes two or more first images captured prior to the target image or only includes two or more second images captured after the target image.

13. The method of claim 1, wherein the plurality of images comprises input images captured by the in vivo capsule camera, previously stitched temporary images, or both.

14. The method of claim 1, wherein a total number of neighboring images in the neighboring image group is determined adaptively according to characteristics of the neighboring image group.

15. The method of claim 1, further comprising repeating said applying deformable registration and said determining marked pixels after a previous target image is excluded from the plurality of images, wherein a new target image is selected from the plurality of images and a new neighboring image group is selected for the new target image.

16. The method of claim 15, wherein a total number of neighboring images in the new neighboring image group is fixed in each iteration.

17. The method of claim 15, wherein a total number of neighboring images in the new neighboring image group in one iteration is different from another iteration.

18. The method of claim 1, wherein the plurality of images correspond to a processed sequence from sequential stitching on input images, wherein said sequential stitching performs pairwise stitching.

19. An apparatus for processing and displaying images captured by an in vivo capsule camera, the apparatus comprising one or more electronic circuits or processors arranged to:
   receive a plurality of images comprising a target image and a neighboring image group of the target image;
   apply deformable registration between the target image and one or more float images in the neighboring image group of the target image;
   determine marked pixels in overlapped areas corresponding to deformed-and-registered image data common to both the target and at least one of said one or more float images; and
   exclude the target image from visualizing the plurality of images if a total number of the marked pixels exceeds a threshold.

* * * * *